United States Patent
Danielson et al.

(10) Patent No.: US 11,120,666 B2
(45) Date of Patent: Sep. 14, 2021

(54) TOWER DEFENSE WAGERING GAME FOR ELECTRONIC GAMING DEVICES

(71) Applicant: IGT, Las Vegas, NV (US)

(72) Inventors: Patrick Danielson, Las Vegas, NV (US); Dwayne Nelson, Las Vegas, NV (US); Cameron Filipour, Las Vegas, NV (US)

(73) Assignee: IGT, Las Vegas, NV (US)

( * ) Notice: Subject to any disclaimer, the term of this patent is extended or adjusted under 35 U.S.C. 154(b) by 100 days.

(21) Appl. No.: 16/184,829

(22) Filed: Nov. 8, 2018

(65) Prior Publication Data

US 2020/0152010 A1    May 14, 2020

(51) Int. Cl.
*G07F 17/32* (2006.01)
*A63F 13/822* (2014.01)

(52) U.S. Cl.
CPC ........ *G07F 17/3262* (2013.01); *A63F 13/822* (2014.09); *G07F 17/3295* (2013.01)

(58) Field of Classification Search
CPC .. G07F 17/3262; G07F 17/3295; G07F 17/32; A63F 13/822
See application file for complete search history.

(56) References Cited

U.S. PATENT DOCUMENTS

| | | | |
|---|---|---|---|
| 9,480,922 B1 | 11/2016 | Kim et al. | |
| 9,524,611 B2 * | 12/2016 | Weitzen | G07F 17/3244 |
| 9,814,968 B1 | 11/2017 | Kim et al. | |
| 10,438,440 B2 * | 10/2019 | Arnone | G07F 17/3286 |
| 2005/0192087 A1 * | 9/2005 | Friedman | G07F 17/32 463/25 |
| 2006/0252473 A1 * | 11/2006 | Stelzer | G07F 17/32 463/1 |
| 2008/0153570 A1 * | 6/2008 | Esses | G07F 17/3244 463/20 |
| 2011/0086685 A1 * | 4/2011 | Schugar | G07F 17/3297 463/2 |
| 2012/0264495 A1 * | 10/2012 | Amaitis | G07F 17/3267 463/10 |
| 2014/0106845 A1 * | 4/2014 | Weitzen | G07F 17/3262 463/20 |
| 2014/0378195 A1 * | 12/2014 | Lee | G07F 17/3295 463/7 |
| 2015/0094139 A1 * | 4/2015 | Kargar | A63F 13/795 463/29 |
| 2015/0235519 A1 * | 8/2015 | Owen | G07F 17/3267 463/25 |

(Continued)

*Primary Examiner* — Chase E Leichliter
(74) *Attorney, Agent, or Firm* — Sage Patent Group

(57) ABSTRACT

In response to receiving a wager, a plurality of game elements are displayed as part of the wagering game. The plurality of game elements includes a play area, an enemy element that travels along an enemy path from an enemy entry location toward an enemy goal location, and a defense element that attacks the enemy element when the enemy element is within a defense attack range of the defense element. An enemy health value of the enemy element is reduced based on the defense element attacking the enemy element when the enemy element is within the defense attack range of the defense element. Reducing the enemy health value of the enemy element to zero destroys the enemy element. In response to the enemy element being destroyed, a second monetary amount is credited to the first credit account.

18 Claims, 9 Drawing Sheets

(56) References Cited

U.S. PATENT DOCUMENTS

| | | | |
|---|---|---|---|
| 2015/0265927 A1* | 9/2015 | Taylor | A63F 13/30 463/9 |
| 2016/0027260 A1* | 1/2016 | Pierce | G07F 17/3295 463/7 |
| 2016/0163158 A1* | 6/2016 | Arnone | G07F 17/3225 463/25 |
| 2017/0213424 A1* | 7/2017 | Arnone | G07F 17/3225 |
| 2017/0243442 A1* | 8/2017 | Arnone | G07F 17/3258 |
| 2018/0296920 A1 | 10/2018 | Dong | |

* cited by examiner

TOWER DEFENSE WAGERING GAME FOR ELECTRONIC GAMING DEVICES

BACKGROUND

Embodiments described herein relate to a wagering game for electronic gaming devices, and in particular for a skill-based wagering game for electronic gaming devices. Electronic gaming devices, such as electronic gaming machines (EGM) or mobile gaming devices, are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three-dimensional display screens. However, the random aspects of wagering games played on electronic gaming devices may be perceived by players as being less enjoyable and entertaining because of the perceived lack of skill required.

BRIEF SUMMARY

According to some embodiments, an electronic gaming machine (EGM) is disclosed. The EGM includes a processor circuit, a display device, an input device, and a memory coupled to the processor circuit. The memory includes machine-readable instructions that, when executed by the processor circuit, in response to a player placing a wager for a first wager amount for a wagering game via the input device, cause the processor circuit to deposit the first wager amount for a wagering game in a first credit account. The memory further includes machine-readable instructions that, when executed by the processor circuit, cause the display device to display a plurality of game elements as part of the wagering game. The plurality of game elements includes a play area including an enemy entry location, an enemy goal location, and an enemy path between the enemy entry location and the enemy goal location. The plurality of game elements further includes an enemy element that travels along the enemy path from the enemy entry location toward the enemy goal location, the enemy element having an enemy health value, and an enemy speed value. The plurality of game elements further includes a defense element that attacks the enemy element when the enemy element is within a defense attack range of the defense element. The defense element includes a defense attack rate and a defense attack damage value. The enemy health value of the enemy element is reduced based on the defense attack rate and the defense attack damage value when the enemy element is within the defense attack range of the defense element. Reducing the enemy health value of the enemy element to zero destroys the enemy element. The memory further includes machine-readable instructions that, when executed by the processor circuit, cause the processor circuit to credit a second monetary amount to a first credit account in response to the enemy element being destroyed.

According to some embodiments, a method is disclosed. The method includes receiving, via an input device of an electronic gaming machine (EGM), a wager by a player for a first monetary amount for a wagering game of the EGM. The method further includes, displaying, at a display device of the EGM, a plurality of game elements as part of the wagering game. The plurality of game elements includes a play area including an enemy entry location, an enemy goal location, and an enemy path between the enemy entry location and the enemy goal location. The plurality of game elements further includes an enemy element that travels along the enemy path from the enemy entry location toward the enemy goal location, the enemy element having an enemy health value, and an enemy speed value. The plurality of game elements further includes a defense element that attacks the enemy element when the enemy element is within a defense attack range of the defense element. The defense element includes a defense attack rate and a defense attack damage value. The enemy health value of the enemy element is reduced based on the defense attack rate and the defense attack damage value when the enemy element is within the defense attack range of the defense element. Reducing the enemy health value of the enemy element to zero destroys the enemy element. The method further includes crediting, by the processor circuit, a second monetary amount to a first credit account in response to the enemy element being destroyed.

According to some embodiments, an electronic gaming system is disclosed. The electronic gaming system includes a processor circuit and a memory coupled to the processor circuit. The memory includes machine-readable instructions that, when executed by the processor circuit, in response to a player placing a wager for a first wager amount for a wagering game via the input device of an electronic gaming machine (EGM), cause the processor circuit to deposit the first wager amount for a wagering game in a first credit account. The memory further includes machine-readable instructions that, when executed by the processor circuit, cause a display device of the EGM to display a plurality of game elements as part of the wagering game. The plurality of game elements includes a play area including an enemy entry location, an enemy goal location, and an enemy path between the enemy entry location and the enemy goal location. The plurality of game elements further includes an enemy element that travels along the enemy path from the enemy entry location toward the enemy goal location, the enemy element having an enemy health value, and an enemy speed value. The plurality of game elements further includes a defense element that attacks the enemy element when the enemy element is within a defense attack range of the defense element. The defense element includes a defense attack rate and a defense attack damage value. The enemy health value of the enemy element is reduced based on the defense attack rate and the defense attack damage value when the enemy element is within the defense attack range of the defense element. Reducing the enemy health value of the enemy element to zero destroys the enemy element. The memory further includes machine-readable instructions that, when executed by the processor circuit, cause the processor circuit to credit a second monetary amount to a first credit account in response to the enemy element being destroyed is disclosed.

DETAILED DESCRIPTION

Embodiments described herein relate to a wagering game for electronic gaming devices, and in particular for a tower defense wagering game for electronic gaming devices. In some embodiments, an electronic gaming device, such as an electronic gaming machine (EGM), may include a processor circuit, a display device, an input device, and a memory coupled to the processor circuit. The memory may include machine-readable instructions that, when executed by the processor circuit, cause the processor circuit to wager a first monetary amount for a wagering game, in response to a player placing a wager via the input device, and the display device displays a plurality of game elements as part of the wagering game. The plurality of game elements may include a play area including an enemy entry location, an enemy goal location, and an enemy path between the enemy entry location and the enemy goal location. The plurality of game elements may further include an enemy element that travels along the enemy path from the enemy entry location toward the enemy goal location, the enemy element having an enemy health value, and an enemy speed value. The plurality of game elements may further include a defense element that attacks the enemy element when the enemy element is within a defense attack range of the defense element. The defense element includes a defense attack rate and a defense attack damage value. The enemy health value of the enemy element may be reduced based on the defense attack rate and the defense attack damage value when the enemy element is within the defense attack range of the defense element. Reducing the enemy health value of the enemy element to zero may destroy the enemy element. The memory may further include machine-readable instructions that, when executed by the processor circuit, cause the processor circuit to credit a second monetary amount to a first credit account in response to the enemy element being destroyed.

Figure 1:
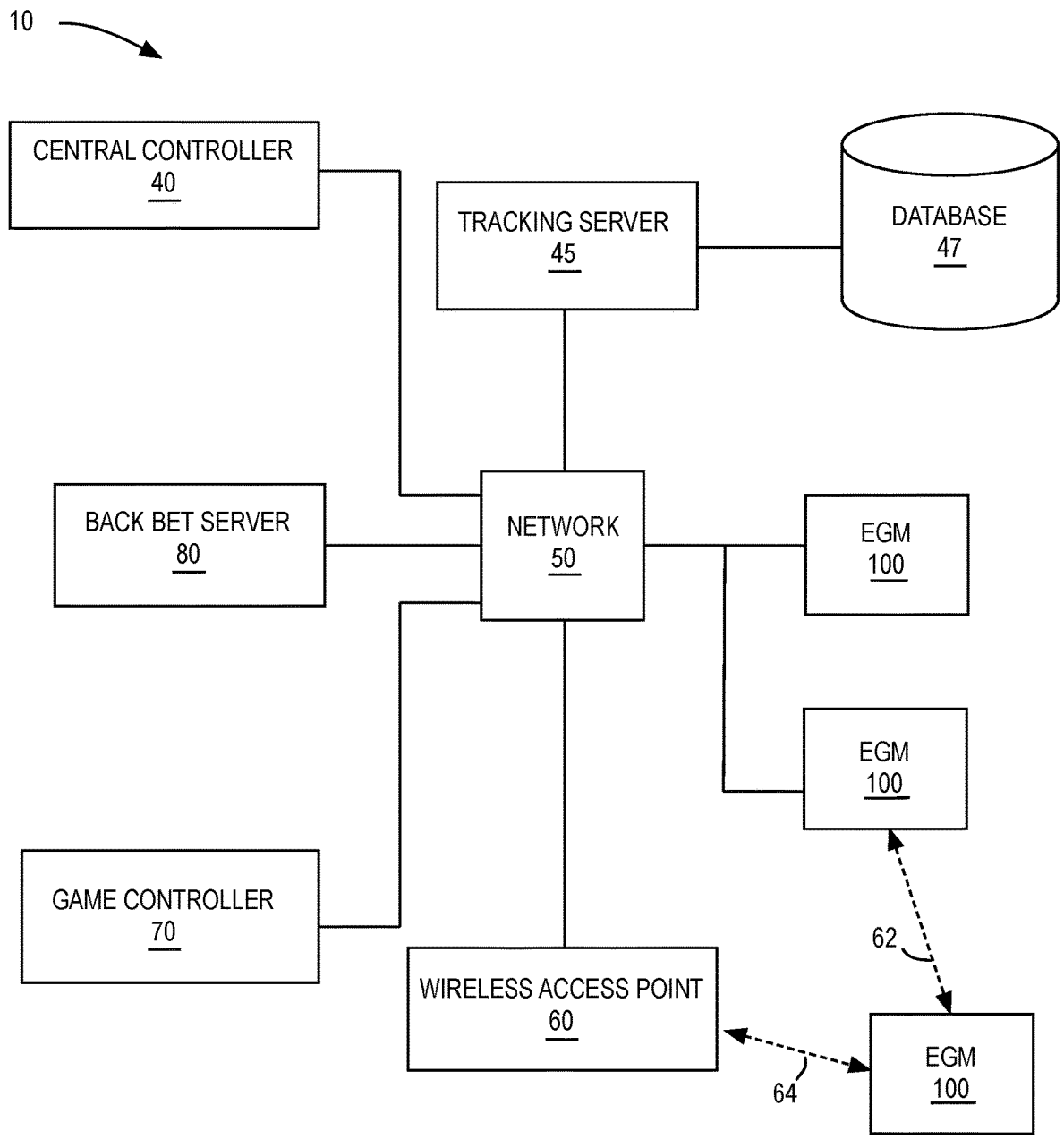
FIG. 1 is a schematic block diagram illustrating a system configuration for detecting statistical anomalies in electronic gaming devices according to some embodiments.

Referring now to FIG. 1, a gaming system 10 including a plurality of EGMs 100 is illustrated. The gaming system 10 may be located, for example, on the premises of a gaming establishment, such as a casino. The EGMs 100, which may be situated on a casino floor, may be in communication with each other and/or at least one central controller 40 through a data communication network 50 or other type of network or remote communication link. The data communication network 50 may be a private data communication network that is operated, for example, by the gaming facility that operates the EGM 100. Communications over the data communication network 50 may be encrypted for security. The central controller 40 may be any suitable server or computing device which includes at least one processor circuit, which may include a processor, and at least one memory or storage device. Each EGM 100 may include a processor circuit that transmits and receives events, messages, commands or any other suitable data or signal between the EGM 100 and the central controller 40. The EGM processor circuit is operable to execute such communicated events, messages or commands in conjunction with the operation of the EGM. Moreover, the processor circuit of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processor circuits. Moreover, in some embodiments, one or more of the functions of one or more EGM processor circuits as disclosed herein may be performed by the central controller 40.

A wireless access point 60 provides wireless access to the data communication network 50. The wireless access point 60 may be connected to the data communication network 50 as illustrated in FIG. 1, or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the EGMs 100 of the system 10 provide primary games and/or secondary games to users of the EGMs 100. Each EGM 100 may include standalone game content, and may also communicate with one or more elements of the system 10 to provide game content to a player of the EGMs 100.

For example, in some embodiments, the EGM 100 may communicate with other components of the system 10 over a wireless interface 62, which may be a WiFi (e.g., IEEE 802.11x) link, a Bluetooth (e.g., IEEE 802.15.x) link, a near field communication (NFC) (e.g., ISO/IEC 18000-3) link, etc. In other embodiments, the EGM 100 may communicate with the data communication network 50 (and devices connected thereto, including EGMs) over a wireless interface 64 with the wireless access point 60. The wireless interface 64 may include a WiFi link, a Bluetooth link, an NFC link, etc. In still further embodiments, the EGM 100 may communicate simultaneously with other components of the system 10 over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

In some embodiments, the gaming system 10 includes a game controller 70. The game controller 70 may be a computing system that communicates through the data communication network 50 with the EGMs 100 to coordinate the provision of primary game content and/or secondary game content to one or more players using the EGMs 100. For example, the game controller 70 may manage an electronic table game having a common dealer and/or game elements that affect multiple players of the game, such as a common dealer hand in blackjack, or a roulette spin result. The game controller 70 may be implemented within or separately from the central controller 40.

In some embodiments, the game controller 70 may coordinate the generation and display of elements of the same primary game and/or secondary game to more than one player by more than one EGM 100. As described in more detail below, this may enable multiple players to interact with elements within the game and/or with each other in real time. This feature can be used to provide a shared multi-player experience to multiple players at the same time. Moreover, in some embodiments, the game controller 70 may coordinate the generation and display of the same game elements to players at different EGMs 100 at a common physical location, e.g., in a common bank of EGMs 100, or at different physical locations, e.g., at different locations within a casino or at different locations at different casinos or other gaming establishments.

In some embodiments, at least some processing of game content, including images and/or objects that are provided by the EGMs 100, may be performed by the game controller 70, thereby offloading at least some processing requirements from the EGMs 100.

A back bet server 80 may be provided to manage back bets placed using an EGM 100 as described in more detail below. An EGM 100 may communicate with the back bet server 80 through the wireless interface 64 and network 50, for example.

In some embodiments, in response to receiving a wager for a monetary amount at an EGM, the EGM displays a wagering game having a plurality of game elements. For example, referring now to FIGS. 2A-2F, a diagram of a tower defense wagering game 200 as displayed on a graphical display interface 202 is illustrated. The tower defense wagering game 200 includes a play area 204, enemy elements 206, and defense elements 208. The play area 204 may include one or more enemy entry locations 210, enemy goal locations 212, and enemy paths 214 between a particular enemy entry location 210 and a particular enemy goal location 212. The enemy elements 206 travel along a particular enemy path 214 from an enemy entry location 210 toward an enemy goal location 212. Each enemy element 206 has an enemy health value, which determines an amount of damage needed to destroy the enemy element 206, and an enemy speed value, which determines a speed at which the enemy element 206 travels along the enemy path 214.

The defense elements 208 attack the enemy elements 206 when a particular enemy element 206 is within a defense attack range 216 of the defense element 208. Each defense element 208 has a defense attack rate, which determines a rate at which the defense element 208 directs individual attacks toward the enemy element 206 when the enemy element 206 is in range, and a defense attack damage value, which determines a value or range of values of damage for each individual attack that hits the enemy element 206. Based on the defense attack rate and the defense attack damage value when the enemy element 206 is within the defense attack range 216 of the defense element 208, the enemy health value of the enemy element 206 is reduced over time as the enemy element 206 travels along the enemy path 214 past the defense element 208. If the enemy health value of the enemy element 206 is reduced to zero, the enemy element 206 is destroyed, and does not reach the enemy goal location 212. When a sufficient number of enemy elements 206 are destroyed, a monetary amount may be credited to the credit account or another credit account as a payout for winning the tower defense wagering game 200. Alternatively or in addition, each time an enemy element 206 is destroyed, a credit amount may be credited to a different credit account. The different credit account may be an in-game credit account that may only be usable within the wagering game, such as for placing and/or upgrading defense elements 208, for example. It should be understood that, as used herein, the term "value" may refer to a parameter value, such as a value for enemy health or defense attack damage, for example, and the term "amount" may refer to a quantity, such as a monetary amount to be debited or credited from an account, for example. A value may include an amount, such as an enemy health value being a particular amount or quantity, for example, but as used herein, a value does not necessarily include an amount.

These and other embodiments have the benefit of providing additional enjoyment to a player by providing a new type of simple and easy-to-understand game experience that utilizes player skill and provides suspense prior to the outcome of the game. The player may experience enjoyment and empowerment through the strategic and/or skill-based elements of the game, such as the timing and placement, and upgrading of defense elements 208. The player may also receive value by exercising partial control over the length of the particular game and/or round, such as by attempting to destroy enemies as quickly as possible or by steering and/or grouping enemies toward particular locations along the enemy path(s), for example, which will be described in greater detail below. These and other embodiments may also address the technical problem of providing skill-based elements as part of a wagering game. These and other embodiments provide a unique technical solution that preserves a predetermined hold percentage for the wagering game while providing skill-based or perceived skill-based elements to enhance the gaming experience for players.

Figure 2A:
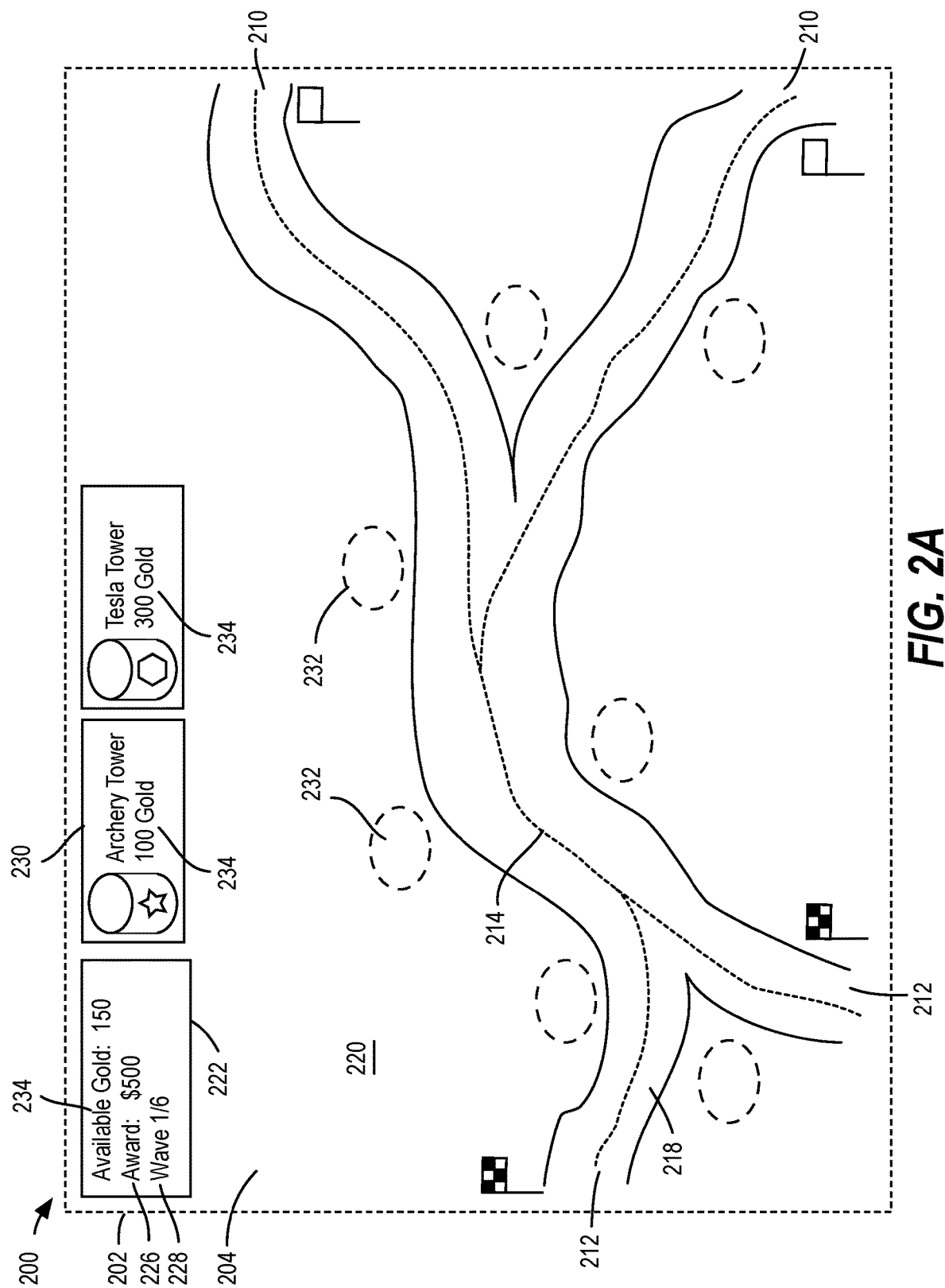
FIGS. 2A-2F are diagrams of graphical display interface for an electronic gaming machine (EGM) illustrating features of a tower defense wagering game, according to some embodiments.

Referring now to FIG. 2A, the play area 204 in this embodiment appears as a branching path 218 in an open field 220, a pair of enemy paths 214 connecting two enemy entry locations 210 to two enemy goal locations 212. An information window 222 includes an available virtual currency indication 224, a current award indication 226, and a wave indication 228. The information window also includes a plurality available defense element indications 230, which may be placed in available defense element positions 232 in exchange for a respective virtual currency wager 234. It should be understood that, in this embodiment, player may place a real currency wager to receive available virtual currency (i.e., gold) for placing and upgrading defense elements 208, but as described in detail below, many other arrangements for placing real and virtual currency wagers are contemplated.

Figure 2B:
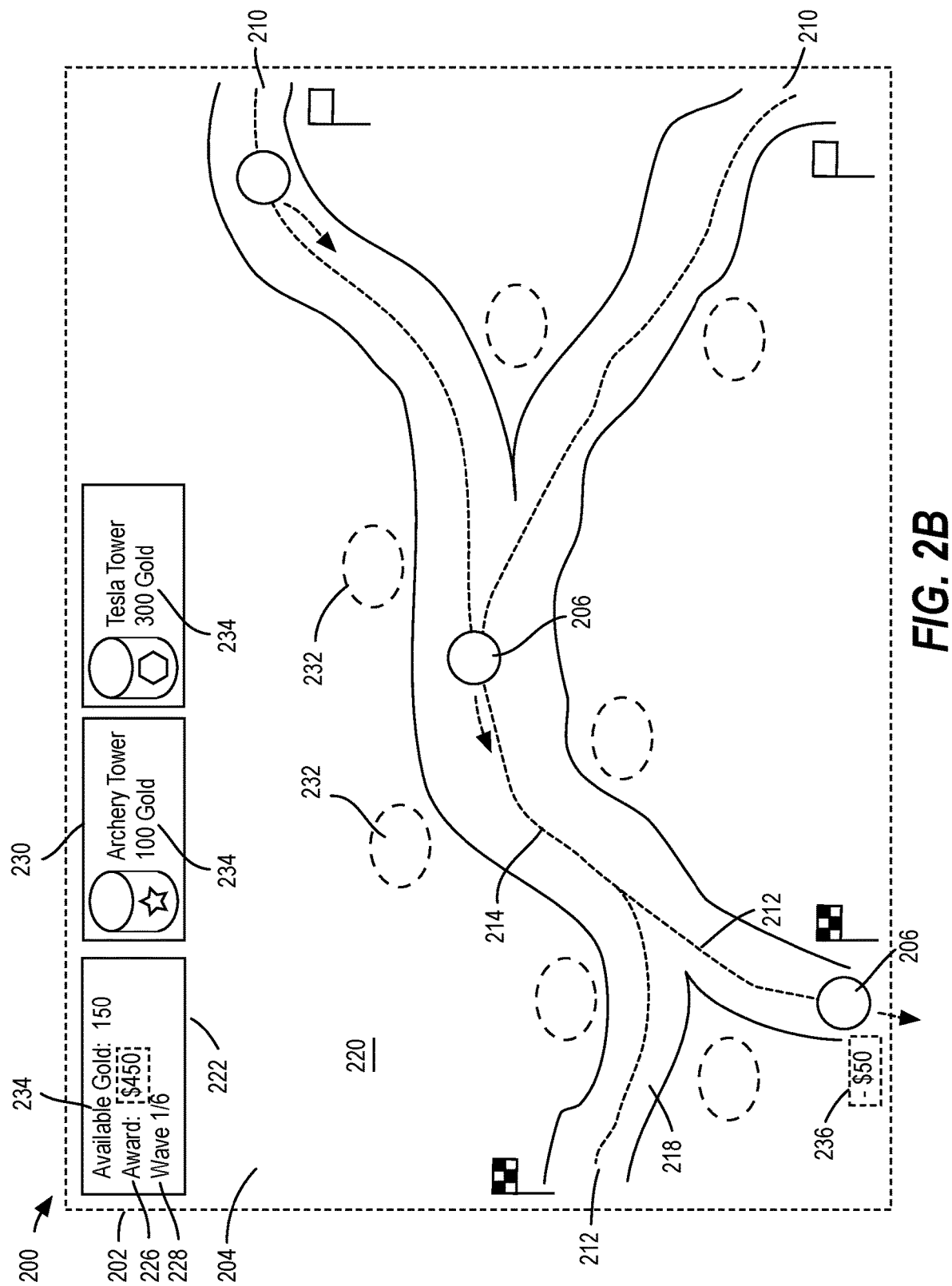

Referring now to FIG. 2B, enemy elements 206 spawn at an enemy entry location 210 and travel along the enemy path 214 toward one of the enemy goal locations 212. In this embodiment, the enemy paths 214 merge into a common path and then split into separate paths, which may allow the enemy elements to dynamically change its enemy path 214 while it is travelling, for example to avoid a particular defense element 208 or group of defense elements. In other embodiments, the enemy path 214 for each enemy element 206 is predetermined and does not change. It should be understood that the number and configurations of the enemy entry locations 210, enemy goal locations 212, and/or enemy paths 214 may be modified or customized, as desired. If an enemy element 206 reaches the enemy goal location 212, the current award indication 226 is reduced by a penalty value 236 ($50 in this example). In this example, the current award at the end of the final (sixth) wave is awarded to the player, but if too many enemy elements 206 reach the enemy goal location 212, the current award may be reduced to $0, resulting in a loss and no payout for the player.

Figure 2C:
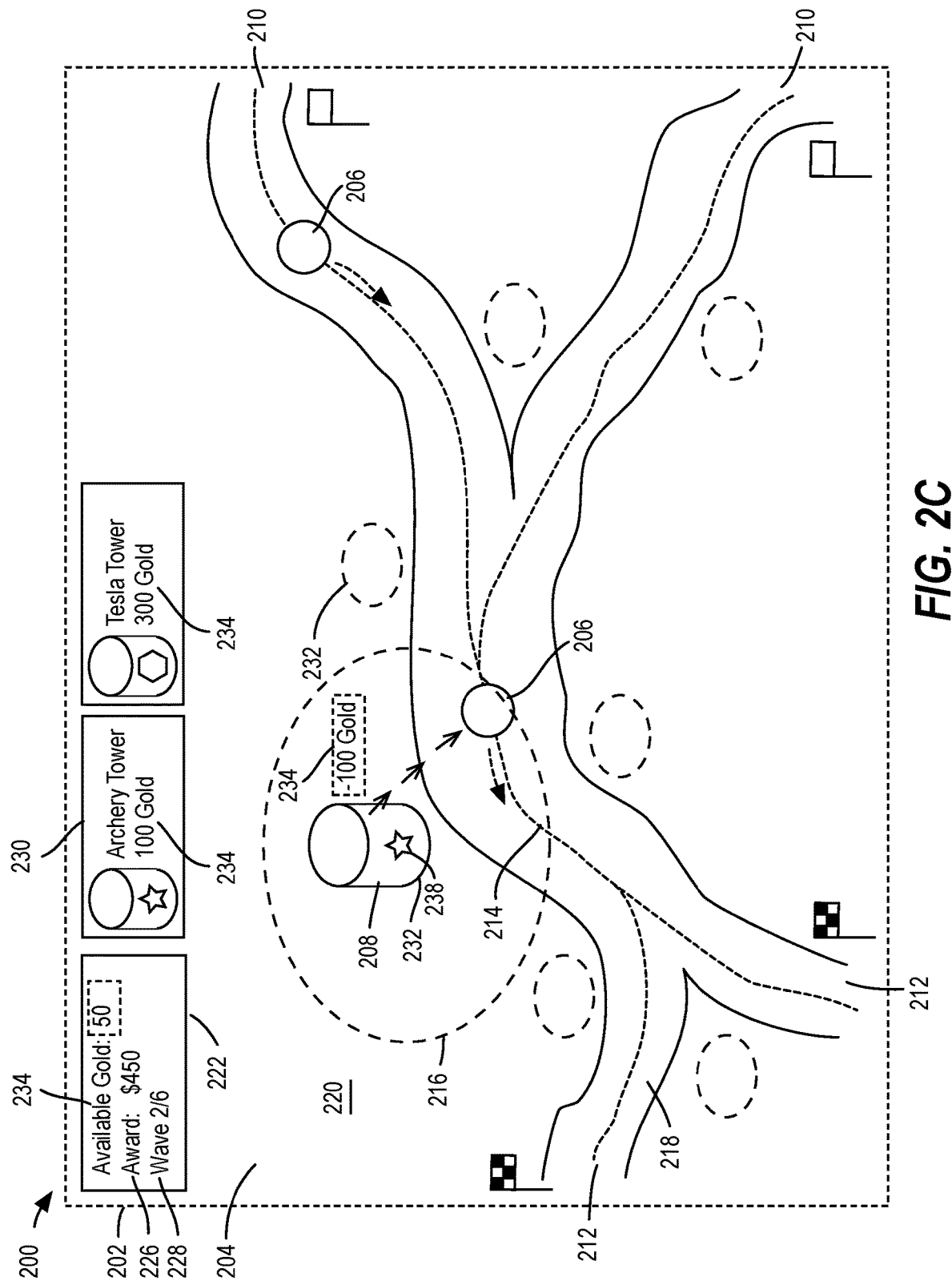

Referring now to FIG. 2C, a player may spend available virtual currency (100 gold in this example) to place a defense element 208 in an available defense element position 232. In this example, the defense element 208 is a level one archer tower, and may include a visual indicium 238 to distinguish it from other types of defense elements. The defense element 208 has a defense attack range 216 that overlaps a portion of the enemy path 214. As the enemy element 206 travels along the enemy path 214 within the defense attack range 216 of the defense element 208, the defense element 208 attacks (e.g., fires arrows toward) the enemy element 206.

Figure 2D:
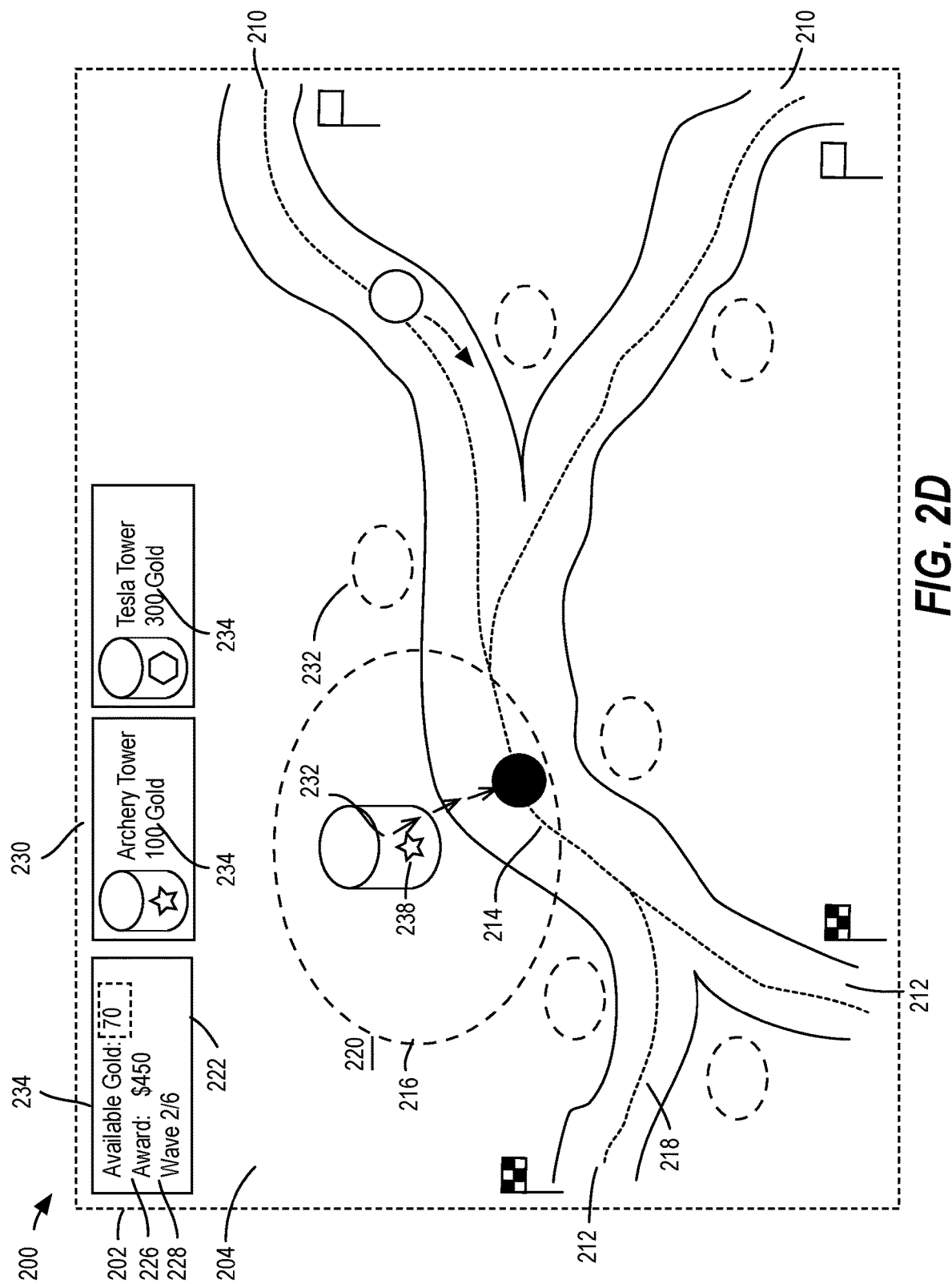

Referring now to FIG. 2D, if the defense element 208 reduces a defense health value of the enemy element 206 to zero, the enemy element 206 is destroyed. Destroying an enemy element 206 may also result in an award of real or virtual currency (20 gold in this example), or other award. In this example, the awarded virtual currency can be used for placing or upgrading additional defense elements 208.

Figure 2E:
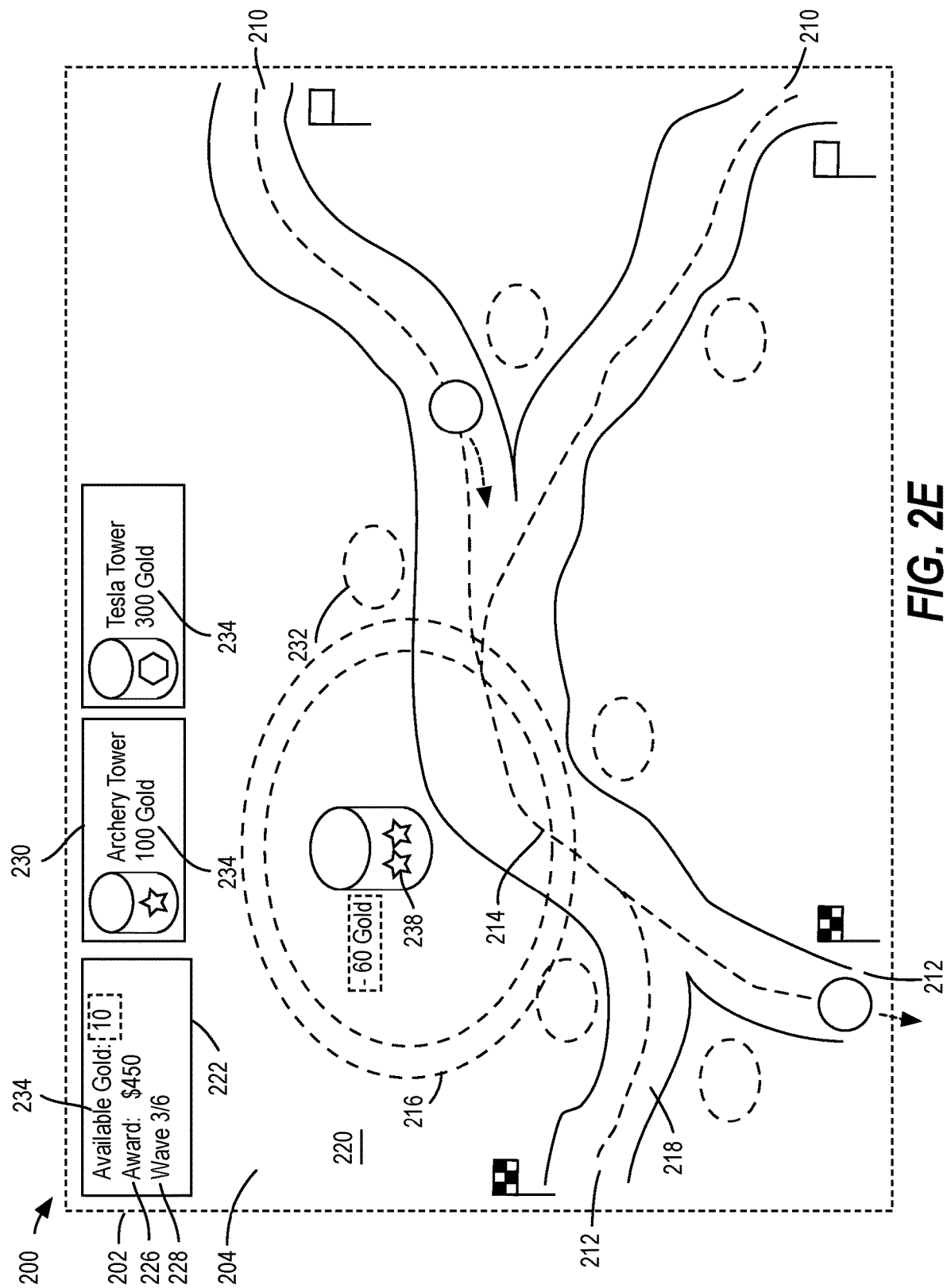

In this regard, FIG. 2E illustrates the player upgrading a defense element 208 into a level two archer tower in exchange for a wager of real or virtual currency (60 gold in this example). In this example, upgrading the defense element 208 increases the defense attack range 216 of the defense element 208 and may also provide other benefits, such as improvements to defense attack rate, defense damage value, or other parameters.

Figure 2F:
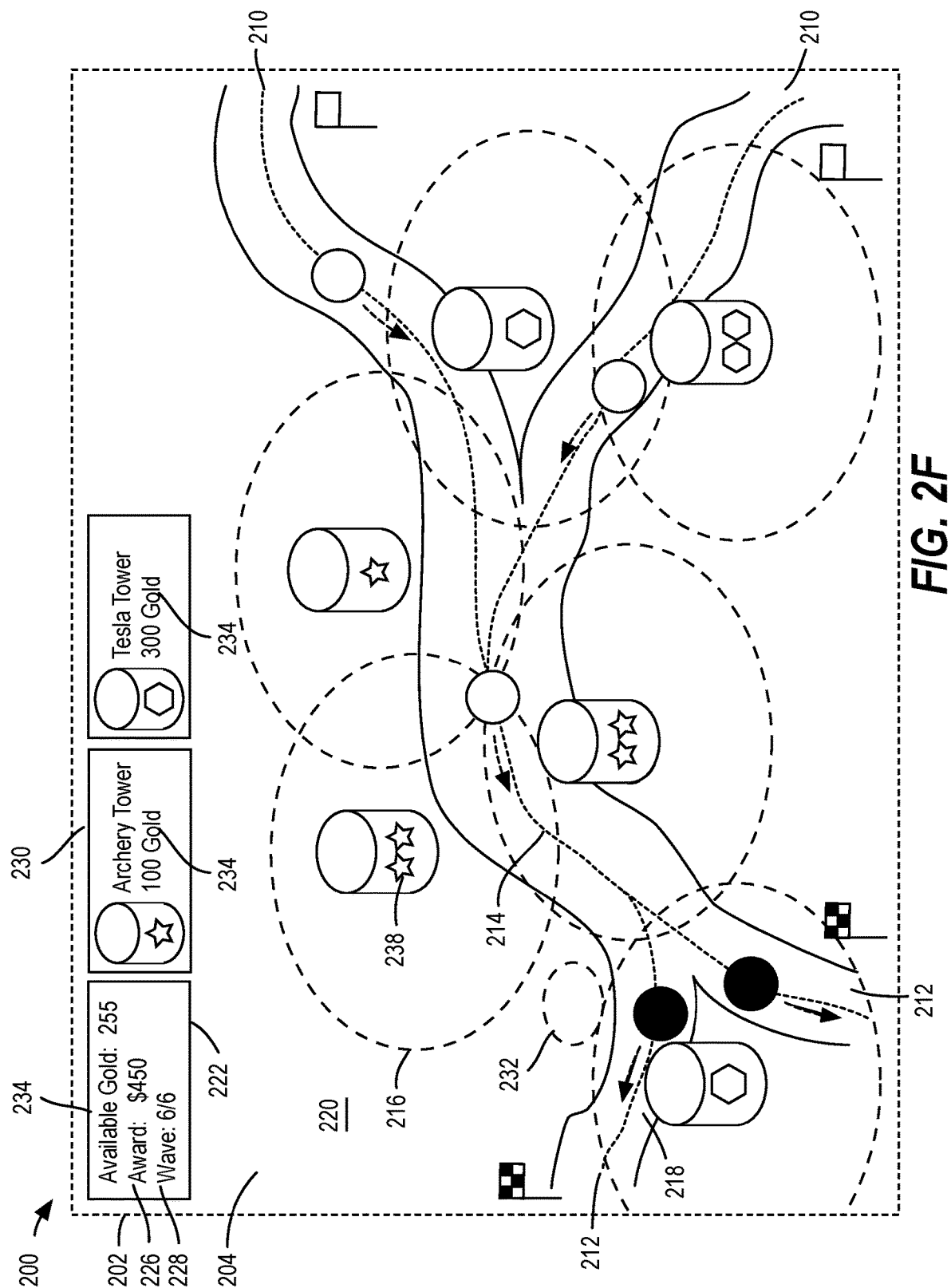

As shown by FIG. 2F, as more enemy elements 206 are destroyed, more virtual currency becomes available for the player to wager on additional defense elements 208 and/or upgrades. In this example, the current award at the end of the final (sixth) wave is awarded to the player, but if too many enemy elements 206 reach the enemy goal location 212, the current award may be reduced to $0, resulting in a loss and no payout for the player.

In the example of FIGS. 2A-2F, the player may apply a real currency credit to an EGM, which provides an amount of in-game credit (e.g., gold) that may be spent purchasing or upgrading defense elements 208, e.g., towers. Different types of defense elements 208 may have different associated purchase or upgrade costs, based on the parameters of the defense element 208, such as different defense attack ranges 216, defense attack rates, and/or defense attack values, for the particular defense element 208. Different types of defense elements 208 may also have different damage types or other parameters, which may affect how the defense element 208 performs against particular types of enemy elements 206, which may have resistance or vulnerability to particular damage types, for example. When placing a defense element 208, the graphical display interface 202 may indicated defense attack range 216, defense attack rate, defense attack value, damage type, or other parameters for the defense element, so that the player has an opportunity to confirm his selection and placement of the particular defense element 208.

In the embodiment of FIGS. 2A-2F, enemy elements 206 spawn at an enemy entry location 210 and travel along an enemy path 214 toward an enemy goal location 212. In other embodiments, enemy elements 206 may spawn at arbitrary or randomly selected locations around or within the play area 204. The enemy elements 206 may also travel along an arbitrary or randomly selected path that does not correspond to a particular enemy path 214, and/or may dynamically change paths based on actions by the player. For example, if the player places a large amount of defense elements 208 along a particular enemy path 214, the enemy elements 206 may dynamically select a different enemy path 214 so as to minimize or avoid travelling within the defense attack ranges 216 of the defense elements 208.

In the embodiment of FIGS. 2A-2F, the defense elements 208 automatically attack enemy elements 206 within the defense attack range 216 of the defense element 208. In some embodiments, if the defense element 208 has multiple enemy elements 206 in range, the defense element 208 may attack the enemy element 206 that is nearest to the enemy goal location 212, may attack all enemy elements 206 within range in turn or randomly, or may prioritize attacking the enemy elements 206 in other ways.

Enemy elements 206 may also have an enemy defense value, e.g., an armor value, which reduces the defense attack damage value for attacks of a particular type from defense elements 208. For example, an enemy element 206 may have armor that reduces the damage it takes from bullet or arrow-based attacks, but that has no effect on the damage it takes from fire-based attacks or attacks that reduce the enemy speed value of the enemy element 206, for example. The enemy defense value, enemy speed value, enemy health value, and/or other enemy parameters may be predetermined and/or may be dynamically determined or randomly determined when the enemy element 206 is spawned. For example, attacks from particular defense elements 208 may reduce or enhance the enemy defense value and/or enemy speed value, which may introduce additional strategic or skill-based elements into the wagering game. The enemy parameters may be within predetermined ranges of values, and may also be selected based on a theoretical hold for the wagering game. For example, if a player is particularly skilled, the wagering game may alter the enemy parameters of the enemy elements 206 to increase the game difficulty.

In some embodiments, the enemy elements 206 can also attack the defense elements 208 to damage or destroy the defense elements 208, which could jeopardize the tower placement wager. For example, an enemy element 206 could have additional parameters, such as an enemy attack range, an enemy attack rate, an enemy attack damage value, which are applied against a defense element 208. The enemy attacks may reduce the defense attack range, the defense attack rate, and/or the defense attack damage value, to reduce the effectiveness of the defense element 208. The enemy attacks may also or alternatively affect other parameters of the defense element 208, such as a defense health value, with the effect of damaging or destroying the defense element 208.

The wagering game may have a predetermined number of rounds, e.g., waves of enemy elements 206, and may also, or alternatively, have a predetermined time limit. For example, the wagering game 200 of FIGS. 2A-2F has six waves of a predetermined number of enemy elements 206. The next wave begins at a predetermined time after the previous wave begins. Alternatively, the next wave may not begin until all of the enemy elements 206 form the previous wave have been destroyed or reached the enemy goal location 212. In another example, new enemy elements 206 may spawn at predetermined times and/or in response to enemy elements 206 being destroyed or reaching the enemy goal location 212, without any limit on the number of enemy elements 206 that may be spawned. For example, the goal of the game may be to destroy as many enemy elements 206 as possible within a predetermined time period, or to destroy as many enemy elements 206 as possible before a predetermined number of enemy elements 206 reach the enemy goal location 212. In some examples, the player may also have the option of speeding up or slowing down the passage of time within the game, so speed up or slow down gameplay, for example. In some examples, rounds may include enemy elements 206 with high defense values that take a longer time and more defense elements 208 to defeat, and that also provide a higher award when they are defeated, which may build suspense and enhance excitement for the player. In some embodiments, the wagering game may provide a hint for an upcoming wave, such as an indication of a number and/or type of enemy element 206 in the upcoming wave.

Player data relating to play of the game may also be saved and accessed for later play sessions. For example, after a player has played a predetermined number of waves of enemy elements 206 over one or more wagering games 200, a graphical theme for the game may change or additional features may be unlocked. For example, after a player has successfully defeated ten waves of enemies, a new type of defense element 208 or upgrade may be unlocked, the in-game cost for a particular defense element 208 or upgrade may be reduced, or an ability of a particular defense element 208 or upgrade may be increased or enhanced, for example. In another example, after a player has successfully defeated ten waves of enemies on a particular planet in a space-themed game, i.e., to conquer or save the planet, a spaceship may travel to a new planet having different challenges, characters and/or landscapes.

In some embodiments, the wagering game 200 combines skill-based functionality with random chance outcomes. For example, individual decisions by a player, such as wagering a certain amount to place or upgrade a defense element 208, interact with random or semi-random actions by the wagering game 200, such as the rate of spawning, type, number, and/or path of enemy elements 206, to produce a random outcome within a predictable or semi-predictable range of outcomes. As noted above, the wagering game 200 may dynamically or randomly alter parameters of the wagering game if the hold percentage of the wagering game 200 is too far outside a range centered around a desired theoretical hold percentage for the wagering game 200. One common problem with introducing skill-based functionality into a wagering game is that a skilled player may have an edge over an unskilled player that may discourage an unskilled player from playing the game. Another problem is that a skilled player may reduce the house edge and theoretical hold percentage below an acceptable threshold. By incorporating these and other features, such as dynamically and/or randomly altering parameters of the wagering game, these problems may be reduced. For example, the wagering game 200 may spawn enemy elements based on a random number generation (RNG) system based on a theoretical hold over a pre-determined number of rounds played.

As noted above, different enemy elements 206 may have different parameters, including different enemy defense values, enemy health values, enemy speed values, and/or awards for destroying the enemy element 206, etc. For example, a first enemy element 206 in a wagering game with a military invasion theme may be visually represented by a tank and may have a relatively high enemy defense value against a particular type of defense element 208 (e.g., a machine gun nest with a bullet attack) and may also have a vulnerability to different defense elements 208 (e.g., a tesla tower with an electrical attack, an oil slick tower that reduces the enemy speed value within a predetermined region of the play area 204, etc.). The award for destroying the defense element 208 may be a predetermined amount of real money (e.g., $0.10) or in-game currency (e.g., 40 gold). Other examples of enemy elements 206 include science fiction enemies (e.g., a bug creature), fantasy enemies (e.g., a goblin), abstract enemies (e.g., an unhappy face), which may each have different defense values, vulnerabilities, resistances, and/or award values for destroying the defense element 208. Enemy elements 206 may also include a special character (e.g., a boss character), which may have high defense value and a correspondingly high award value. In some examples, destroying the special character or other enemy element 206 may trigger a bonus or progressive payout. The awards may also be randomly or semi-randomly chosen according to a standard paytable, a paytable with progressive awards, or any other method, as desired. In some embodiments, an award may be based on the player achieving a particular goal, such as destroying a predetermined number of enemy elements 206 during a wave or within a predetermined amount of time, allowing less than a predetermined number of enemy elements 206 to reach the enemy goal location(s) 212, etc. For example, the wagering game 200 could increase or decrease an award based on how quickly enemy elements 206 are destroyed, which may encourage players to over bet or underbet. Destroying all of the enemy elements 206 before a certain point in time or position along the enemy path 214 could be a prerequisite to winning a certain prize such as a progressive, bonus win or real or virtual currencies. For example if all of the enemy elements 206 are eliminated before they reach the halfway point of the enemy path 214, the player could win 10 units of the virtual currency as a bonus. This may incentivize the player to place and/or upgrade more defense elements 208 so that all the enemy elements 206 could be eliminated sooner. If a player fails to achieve the goal, an award may be forfeited, or can be placed into a jackpot pool, e.g., a progressive pool, to be awarded later.

Special enemy elements 206, such as progressive enemy elements 206 for example, may be presented randomly or at predetermined times. In some embodiments, the special enemy element 206 might look like other enemy elements 206, and may be revealed to be a special enemy element 206 when destroyed. In this example, the enemy element 206 may be determined to be the special enemy element 206 before spawning. In other examples, the special enemy element 206 may be selected at any time, such as at a predetermined time, at a predetermined location on the enemy path 214, or when the enemy element 206 is destroyed, for example. In one example, the wagering game 200 can choose a number between one and one million, representing a one in one million chance that the progressive is triggered. If that chosen number is the value one, the game adds a progressive enemy element 206 to the play area 204. If the player destroys the progressive enemy element, the player is awarded the progressive. In some embodiments, if the player is not successful, the progressive award continues to build. In another embodiment, the progressive enemy element 206 is randomly generated and the player is only given the chance at the progressive award if the player first destroys the progressive enemy element 206.

In some embodiments, destroying enemy elements 206 produce a token or other indication that adds to the progressive meter. When the progressive meter meets a predetermined threshold, the progressive may be triggered and/or awarded to the player. In another embodiment, the progressive may be evaluated when a certain combination of the enemies is eliminated in a certain order. For example, a wave or level may include five red enemy elements 206 and five blue enemy elements 206. If a player destroys all of the red enemy elements 206 before destroying any of the blue enemy elements 206, the progressive or other bonus may be triggered and/or awarded to the player.

These and other features may lead to unique and nonconventional strategies for playing the wagering game 200. For example, where real currency is used to purchase defense elements 208, it is possible for a player to over-bet a wave and purchase so many defense elements 208 and/or upgrades that the awards for defeating the enemy elements 206 is less than the amount spent by the player on defense elements 208. In this example, the player may be able to easily defeat the enemy elements 206, but will still lose money because he spent too much real or in-game money on defense elements 208. Conversely, a player can attempt to defeat a wave while purchasing as few defense elements 208 as possible in an attempt to maximize the potential award. In this example, the player has a greater risk of losing, but successfully destroying the enemy elements 206 will result in a larger relative payout for a smaller relative wager on fewer defense elements 208.

Game awards may include monetary and/or non-monetary awards, such as promotional credits, points, physical prizes, etc. Additional game features may include progressive or multi-level progressive awards, individual and/or shared bonus games and/or awards. Features may include multi-player features such as cooperative or competitive play, multi-player features across a particular bank of EGMs, location (e.g., casino), operator (e.g., group of commonly operated casinos), region, or without geographic or location restriction. In some embodiments, special features, such as progressive awards, may have a higher success threshold, such as conditioning an award on destroying all the enemy elements 206 in a wave or level. Features may include personalization features, such as customized backgrounds, landscapes, and/or characters, special defense elements 208 such as bombs that can destroy a large group of enemy elements 206 within the play area 204.

While the above examples are described with reference to a graphical display interface for a land-based EGM, such as a slot-machine style EGM, it should be understood that other types of features and/or devices may be used for other types of EGMs, such as a player mobile device or network-connected computing device, and/or for a service window for and EGM or other device. Features may be driven locally, e.g., on the EGM other device, or remotely, e.g., via a server or host system in communication with another device, either as a standalone game or in connection with another game on the device.

In some embodiments, the wagering game 200 may include persistent elements that allow for a player to continue the wagering game 200 from a predetermined milestone or checkpoint. For example, the wagering game may have 100 different levels, with the awards and/or difficulty changing over time. For example, as the player moves up in levels the maps and skill level might change to reflect an increase in potential awards. The player's current level can be stored with the host system so that the player can resume at any time. In one embodiment, the player may select any level at any time, which would allow the player to choose the amount of skill or betting that matches the player's play style. For example, the player might choose to go to level 25 where the minimum bet is $5.00 but there is a larger win available, such as $10,000. Or the player might choose to go to level 1 where there is little skill required and a correspondingly lower potential award.

In some examples, each defense element 208 may have a limited amount of attacks, e.g., ammunition. For example, a $1.00 sniper tower may allow for exactly ten shots (i.e., $0.10 per shot), with a paytable of $0.01 to $0.25 per enemy shot, where the wagering game 200 is configured for an expected return of 92%. In this example, the wagering game 200 includes a perceived skill element but is actually a traditional slot game without an actual skill-based element.

In other examples, some levels, e.g., earlier levels with lower payouts, may include these or other perceived skill mechanisms, with later levels including true skill-based components.

In some examples, the wagering game 200 may randomly choose the number and types of enemies. The player will not know this number but may have some hint based on the level. For example, the wagering game 200 may provide a hint that level five will include a small number of blue enemies, and then randomly select a number of blue enemies between 5 and 10, with each enemy having a random enemy health value between 10 and 25. The player in this example can place three $1.00 defense elements 208 along the enemy path 214 for a total bet of $3.00. Each defense element 208 is able to shoot every 5 seconds and does 5 to 10 damage points to the enemy within range when struck. Each enemy is assigned a prize value such as $1.00, so that destroying less than three enemies is a loss, destroying exactly three enemies is break-even, and destroying more than three enemies is a win. However, if the player choses to place two additional $1.00 defense elements 208, destroying enemies is easier, but the threshold for breaking even is increased to five enemies. Conversely, the player could choose to place fewer defense elements 208, which increases the difficulty but also reduces the break-even number of enemies and increases the net payout if the player is successful.

In some embodiments, a bonus award may be provided to encourage more aggressive betting. For example, the wagering game may begin with a pot of $50.00. The player may purchase and place defense elements 208, with the pot increasing by the amount wagered (e.g., by $1.00 for each $1.00 defense element 208 placed. For each enemy element 206 that reaches the enemy goal location 212, the pot is similarly reduced (e.g., by $1.00 for each enemy element 206 that escapes). Alternatively, the maximum pot may be predetermined with each escaping enemy element 206 reducing the pot by a fixed amount (e.g., $0.25), or a bonus pot may be offered if the player can destroy all of the enemy elements 206. This may give the player an incentive to risk over betting in order to destroy all of the enemy elements 206.

As noted above, the wagering game 200 may include real or virtual currency accounts, or combinations thereof. One advantage of using a virtual currency element is that positive feedback may be provided to the player even when real money is not directly awarded. For example, in the embodiment of FIGS. 2A-2F, defeating enemies produces virtual currency (i.e., gold) that can be used to purchase defense elements 208 in the game, but may have no value outside of the game. This arrangement may discourage under-betting because there would be no real money benefit to conserving virtual currency. For example, the real-money award may be based on minimizing the number of enemy elements 206 that escape, which may incentivize the player to spend the virtual currency in order to increase the chances of killing all the enemies in order to win a real money award. These and other arrangements also provide flexibility to creating game mathematics in a way that makes the game enjoyable for players while ensuring an acceptable hold percentage for the game operator.

As discussed above, in some embodiments, the player may have the option of upgrading a defense element 208 that has already been placed in the play are 204, such as by wagering real or virtual currency to increase the effectiveness of the defense element 208. Upgrades for a defense element 208 may include increased an increased enemy damage value (e.g., firing power), increased enemy damage rate (e.g., firing rate), change in damage type (e.g., changing damage type from laser to torpedo). As discussed above, different types of attacks may have different effectivenesses against different types of enemy elements 206 (e.g., red vs. blue enemies).

Different damage types may also affect individual enemies or groups of enemies, as desired. For example, a machine gun defense element 208 may only damage one enemy per attack, while a mortar defense element may damage all enemies within a predetermined radius of the attack target. This may add an additional layer of strategy by making it desirable to create bottlenecks and cause enemy elements 206 to cluster together so that individual attacks can cause damage to as many enemy elements 206 as possible.

Upgraded defense elements 208 may increase a player's chances of winning an award (e.g., real or virtual currency), and may have different appearances, decorations, styles (e.g., modern, classic, futuristic, alien, cartoon etc.), and may have different timing and/or distance parameters.

Figure 3:
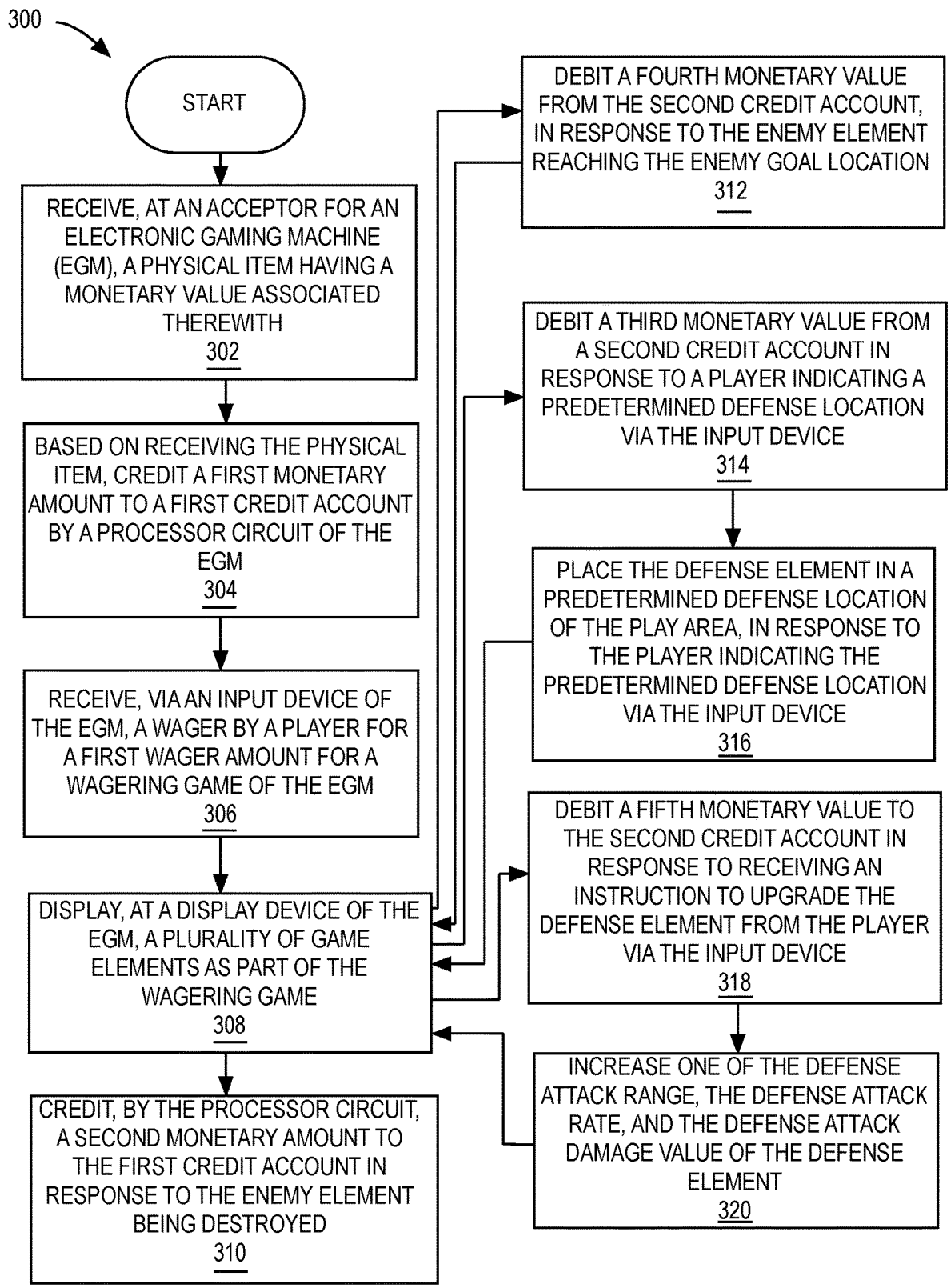
FIG. 3 is a flowchart illustrating operations of systems/methods according to some embodiments.

Referring now to FIG. 3, a flowchart illustrating operations of systems/methods according to some embodiments is illustrated. The operations 300 of FIG. 3 may include receiving, at an acceptor for an electronic gaming machine (EGM), a physical item having a monetary value associated therewith (Block 302). The operations 300 may include, based on receiving the physical item, crediting a first monetary amount to a first credit account by a processor circuit of the EGM (Block 304). The operations 300 may include receiving, via an input device of the EGM, a wager by a player for a first wager amount for a wagering game of the EGM (Block 306). The operations 300 may include displaying, at a display device of the EGM, a plurality of game elements as part of the wagering game (Block 308).

As discussed above, the plurality of game elements may include a play area including an enemy entry location, an enemy goal location, and an enemy path between the enemy entry location and the enemy goal location. The plurality of game elements may further include an enemy element that travels along the enemy path from the enemy entry location toward the enemy goal location, the enemy element having an enemy health value, and an enemy speed value. The plurality of game elements may further include a defense element that attacks the enemy element when the enemy element is within a defense attack range of the defense element. The enemy element may also have an enemy defense value that reduces the defense attack damage value for attacks by the defense element against the enemy element.

The defense element may include a defense attack rate and a defense attack damage value, with the enemy health value of the enemy element being reduced based on the defense attack rate and the defense attack damage value when the enemy element is within the defense attack range of the defense element. Reducing the enemy health value of the enemy element to zero may destroy the enemy element. The enemy element may also have an enemy attack rate and an enemy attack damage value, and may attack the defense element when the defense element is within an enemy attack range of the enemy element, with one of the defense attack range, the defense attack rate, and the defense attack damage value being reduced based on the enemy attack rate and the enemy attack damage value when the enemy element attacks the defense element. The defense element may include one or more first defense elements and one or more second defense elements, with respective first and second defense attack ranges, defense attack rates, and defense attack values, or other parameters that may be different from each other. In some embodiments, different enemy elements may have different enemy defense values that reduce a defense attack damage value for attacks by particular defense elements against the enemy element, but not other defense elements, or that reduce a defense attack damage value for attacks by different defense elements by different amounts.

The operations 300 may further include crediting, by the processor circuit, a second monetary amount to the first credit account in response to the enemy element being destroyed (Block 310). In some embodiments, the second monetary amount is determined based on a current monetary amount in the second credit account, which may include real and/or virtual currency. In some examples, the second credit account may be virtual currency (e.g., gold), that can only be used in-game to purchase defense elements or other assets. In another example, the second credit account may be a real money account that may be credited or debited separately from the first credit account based on different conditions being met, such as triggering a progressive or bonus game, for example. The operations 300 may further include debiting a fourth monetary amount from the second credit account, in response to the enemy element reaching the enemy goal location (Block 312).

In addition, the operations 300 may further include debiting a third monetary amount from a second credit account in response to a player indicating a predetermined defense location via the input device (Block 314), followed by placing the defense element in a predetermined defense location of the play area, in response to the player indicating the predetermined defense location via the input device (Block 316). In some embodiments, these operations may occur at any time during game play, or may be restricted to certain times during game play, as desired. The operations 300 may further include debiting a fifth monetary amount to the second credit account in response to receiving an instruction to upgrade the defense element from the player via the input device (Block 318), followed by increasing one of the defense attack range, the defense attack rate, and the defense attack damage value of the defense element (Block 320). Here again, in some embodiments, these operations may occur at any time during game play, or may be restricted to certain times during game play, as desired.

Figure 4:
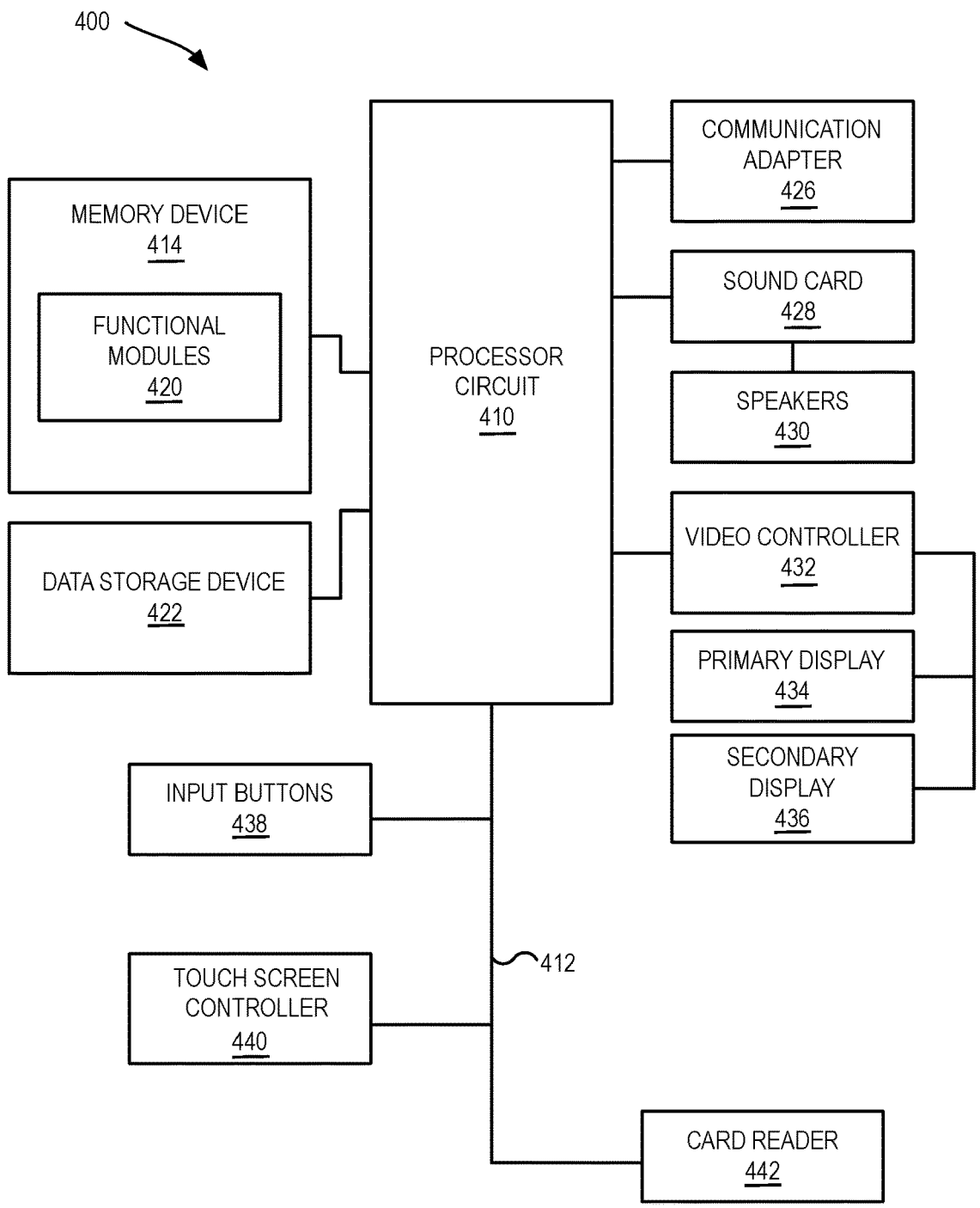
FIG. 4 is a block diagram of components of a computing device similar to the computing devices and components of FIG. 1, according to some embodiments.

Referring now to FIG. 4, a block diagram of components of a computing device 400 similar to the computing devices and components of FIG. 1 is illustrated, according to some embodiments. The computing device 400 of FIG. 4 and/or components thereof may be suitable for use as or in connection with various components of the devices, systems and methods described herein. As shown in FIG. 4, the computing device 400 may include a processor circuit 410, or processor circuit, that controls operations of the computing device 400. Although illustrated as a single processor circuit, multiple special purpose and/or general purpose processor circuits and/or processor circuit cores may be provided in the computing device 400. For example, the computing device 400 may include one or more of a video processor circuit, a signal processor circuit, a sound processor circuit and/or a communication controller that performs one or more control functions within the computing device 400. The processor circuit 410 may include and/or may be included in various components, which may be variously referred to as a "controller," "microcontroller," "microprocessor" or simply a "computer," for example. The processor circuit may further include one or more application-specific integrated circuits (ASICs).

Various components of the computing device 400 are illustrated in FIG. 4 as being connected to the processor circuit 410. It will be appreciated that the components may be connected to the processor circuit 410 through a system bus 412, a communication bus and controller, such as a USB controller and USB bus, a network interface, or any other suitable type of connection.

The computing device 400 further includes a memory device 414 that stores one or more functional modules 420 for performing the operations described above. The memory device 414 may store machine readable instructions, such as program code for example, executable by the processor circuit 410, to control the computing device 400. The memory device 414 may include random access memory (RAM), which can include non-volatile RAM (NVRAM), magnetic RAM (ARAM), ferroelectric RAM (FeRAM) and other forms as commonly understood in the gaming industry. In some embodiments, the memory device 414 may include read only memory (ROM). In some embodiments, the memory device 414 may include flash memory and/or EEPROM (electrically erasable programmable read only memory). Any other suitable magnetic, optical and/or semi-conductor memory may operate in conjunction with the gaming device disclosed herein.

The computing device 400 may further include a data storage device 422, such as a hard disk drive or flash memory. The data storage device 422 may store program data, player data, audit trail data or any other type of data. The data storage device 422 may include a detachable or removable memory device, including, but not limited to, a suitable cartridge, disk, CD ROM, DVD or USB memory device.

The computing device 400 may include a communication adapter 426 that enables the computing device 400 to communicate with remote devices over a wired and/or wireless communication network, such as a local area network (LAN), wide area network (WAN), cellular communication network, or other data communication network. The communication adapter 426 may further include circuitry for supporting short range wireless communication protocols, such as Bluetooth and/or near field communications (NFC) that enable the computing device 400 to communicate, for example, with a mobile communication device operated by a player.

The computing device 400 may include one or more internal or external communication ports that enable the processor circuit 410 to communicate with and to operate with internal or external peripheral devices, such as a sound card 428 connected to speakers 430, a video controller 432 connected to a primary display 434 and/or a secondary display 436, input buttons 438, a touch screen controller 440, or a card reader 442, for example. Additional internal or external peripheral devices that may be used include eye tracking devices, position tracking devices, cameras, accelerometers, arcade sticks, bar code readers, bill validators, biometric input devices, button panels, card readers, currency acceptors and dispensers, additional displays or video sources, expansion buses, information panels, keypads, lights, mass storage devices, microphones, motion sensors, motors, printers, reels, SCSI ports, solenoids, speakers, thumb drives, ticket readers, trackballs, touchpads, wheels, and wireless communication devices. In some embodiments, internal or external peripheral devices may communicate with the processor circuit through a universal serial bus (USB) hub (not shown) connected to the processor circuit 410.

The present disclosure contemplates a variety of different systems and/or devices, each having one or more of a plurality of different features, attributes, or characteristics. In certain such embodiments, computerized instructions for controlling any features or content displayed by the display devices or other devices are executed by the central server, central controller, or remote host. In such "thin client" embodiments, the central server, central controller, or remote host remotely controls any games (or other suitable interfaces) displayed by the device, and the device is utilized to display such features (or other suitable interfaces) and to receive one or more inputs or commands. In other such embodiments, computerized instructions for controlling any features displayed by the device are communicated from the central server, central controller, and/or remote host to the device and are stored in at least one memory device of the device. In such "thick client" embodiments, the processor circuit of the device executes the computerized instructions to control any games (or other suitable interfaces) displayed by the device.

In some embodiments in which the system may include: (a) a device configured to communicate with a central server, central controller, or remote host through a data network; and/or (b) a plurality of devices configured to communicate with one another through a data network, the data network is an internet or an intranet. In these and other embodiments, an internet browser of the device is usable to access an internet game page from any location where an internet connection is available. In one such embodiment, after the internet content page is accessed, the central server, central controller, or remote host identifies a user prior to enabling that user to use particular features. In one example, the central server, central controller, or remote host identifies the user by determining that the user is logged into a user account via an input of a unique username and password combination assigned to the user. It should be appreciated, however, that the central server, central controller, and/or remote host may identify the user in any other suitable manner, such as by validating a user tracking identification number associated with the user; by reading a user tracking card or other smart card inserted into a card reader (as described below); by validating a unique user identification number associated with the user by the central server, central controller, and/or remote host; or by identifying the device, such as by identifying the MAC address or the IP address of the internet facilitator. In various embodiments, once the central server, central controller, and/or remote host identifies the user, the central server, central controller, and/or remote host enables features and/or content, and displays the features and/or content via the internet browser of the EGM.

It should be appreciated that the central server, central controller, and/or remote host and the device(s) are configured to connect to the data network or remote communications link in any suitable manner. In various embodiments, such a connection may be accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of devices from an ever-increasing quantity of remote sites. It should also be appreciated that the enhanced bandwidth of digital wireless communications may render such technology suitable for some or all communications, such as encrypted communications, for example. Higher data transmission speeds may be useful for enhancing the sophistication and response of the display and interaction with users.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more machine readable media having machine readable instructions, such as computer readable media having computer readable program code for example, embodied thereon.

Any combination of one or more machine readable media may be utilized. The machine readable media may be a machine readable signal medium or a machine readable storage medium. A machine readable storage medium may be, for example, but not limited to, an electronic, magnetic, optical, electromagnetic, or semiconductor system, apparatus, or device, or any suitable combination of the foregoing. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a machine readable storage medium may be any medium that can contain, or store a program for use by or in connection with an instruction execution system, apparatus, or device.

A machine readable signal medium may include a propagated data signal with machine readable instructions embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device. Instructions embodied on a machine readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor circuit of a general purpose computer, special purpose computer, or other programmable data processing apparatus to produce a machine, such that the instructions, which execute via the processor circuit of the computer or other programmable instruction execution apparatus, create a mechanism for implementing the functions/acts specified in the flowchart and/or block diagram block or blocks.

These computer program instructions may also be stored in a machine readable medium that when executed can direct a computer, other programmable data processing apparatus, or other devices to function in a particular manner, such that the instructions when stored in the machine readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well and may be interpreted as "one or more", unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. An electronic gaming machine (EGM) comprising:
a processor circuit; a display device; an input device; and
a memory coupled to the processor circuit, the memory comprising machine-readable instructions that, when executed by the processor circuit:
cause the processor circuit to credit a first real currency monetary amount to a first credit account;
cause the processor circuit to wager, from a first credit account, a first real currency wager amount for a wagering game, in response to a player placing a wager via the input device;
cause the display device to display a plurality of game elements as part of the wagering game, the plurality of game elements comprising:
a play area comprising an enemy entry location, an enemy goal location, and an enemy path between the enemy entry location and the enemy goal location;
an enemy element that travels along the enemy path from the enemy entry location toward the enemy goal location, the enemy element comprising an enemy health value, and an enemy speed value; and
a defense element that attacks the enemy element when the enemy element is within a defense attack range of the defense element, the defense element comprising a defense attack rate and a defense attack damage value, wherein the enemy health value of the enemy element is reduced based on the defense attack rate and the defense attack damage value when the enemy element is within the defense attack range of the defense element, and wherein reducing the enemy health value of the enemy element to zero destroys the enemy element;
in response to the enemy element being destroyed, cause the processor circuit to credit a second real currency monetary amount to the first credit account; and
in response to the enemy element reaching the enemy goal location, cause the processor circuit to debit a third monetary amount.

2. The EGM of claim 1, the memory further comprising machine-readable instructions that, when executed by the processor circuit:
cause the processor circuit to place the defense element in a predetermined defense location of the play area, in response to the player indicating the predetermined defense location via the input device.

3. The EGM of claim 2, the memory further comprising machine-readable instructions that, when executed by the processor circuit:
cause the processor circuit to, prior to placing the defense element in the predetermined defense location of the play area, debit a fourth monetary amount from a second credit account in response to the player indicating the predetermined defense location via the input device.

4. The EGM of claim 3, the memory further comprising machine-readable instructions that, when executed by the processor circuit:
cause the processor circuit to, in response to receiving an instruction to upgrade the defense element from the player via the input device:
debit a fifth monetary amount to the second credit account; and
increase one of the defense attack range, the defense attack rate, and the defense attack damage value of the defense element.

5. The EGM of claim 3, the memory further comprising machine-readable instructions that, when executed by the processor circuit:
cause the processor circuit to credit the second monetary amount to the first credit account in response to the enemy element being destroyed by causing the processor circuit to determine the second monetary amount based on a current monetary amount in the second credit account.

6. The EGM of claim 1, wherein the first credit account is a real currency credit account, and
wherein the machine-readable instructions that cause the processor circuit to debit a third monetary amount further cause the processor circuit to debit the third monetary amount from a second credit account comprising a virtual currency credit account.

7. The EGM of claim 1, wherein the enemy element further comprises an enemy defense value that reduces the defense attack damage value for attacks by the defense element against the enemy element.

8. The EGM of claim 1, the memory further comprising machine-readable instructions that, when executed by the processor circuit:
cause the enemy element to attack the defense element when the defense element is within an enemy attack range of the enemy element, the enemy element further comprising an enemy attack rate and an enemy attack damage value, wherein one of the defense attack range, the defense attack rate, and the defense attack damage value is reduced based on the enemy attack rate and the enemy attack damage value when the enemy element attacks the defense element.

9. The EGM of claim 1, wherein the defense element comprises a first defense element and a second defense element,
wherein the defense attack range of the first defense element is a first defense attack range and the defense attack range of the second defense element is a second defense attack range, wherein the defense attack rate of the first defense element is a first defense attack rate and the defense attack rate of the second defense element is a second defense attack rate different from the first defense attack rate, and wherein the defense attack damage value of the first defense element is a first defense attack damage value and the defense attack range of the second defense element is a second defense attack damage value different from the first defense attack damage value.

10. The EGM of claim 9, wherein the enemy element further comprises a first enemy defense value that reduces the first defense attack damage value for attacks by the first defense element against the enemy element.

11. The EGM of claim 10, wherein the enemy element further comprises a second enemy defense value different from the first enemy defense value that reduces the second defense attack damage value for attacks by the second defense element against the enemy element.

12. A method comprising:
crediting, by a processor circuit for an electronic gaming machine (EGM), a first real currency monetary amount to a first credit account;
receiving, via an input device of the EGM, a wager by a player for a first real currency wager amount for a wagering game of the EGM;
displaying, at a display device of the EGM, a plurality of game elements as part of the wagering game, the plurality of game elements comprising:
a play area comprising an enemy entry location, an enemy goal location, and an enemy path between the enemy entry location and the enemy goal location;
an enemy element that travels along the enemy path from the enemy entry location toward the enemy goal location, the enemy element comprising an enemy health value, and
an enemy speed value; and
a defense element that attacks the enemy element when the enemy element is within a defense attack range of the defense element, the defense element comprising a defense attack rate and a defense attack damage value, wherein the enemy health value of the enemy element is reduced based on the defense attack rate and the defense attack damage value when the enemy element is within the defense attack range of the defense element, and wherein reducing the enemy health value of the enemy element to zero destroys the enemy element;
in response to the enemy element being destroyed, crediting, by the processor circuit, a second real currency monetary amount to the first credit account in response to the enemy element being destroyed; and
in response to the enemy element reaching the enemy goal location, debiting a third monetary amount.

13. The method of claim 12, further comprising:
placing the defense element in a predetermined defense location of the play area, in response to the player indicating the predetermined defense location via the input device.

14. The method of claim 13, further comprising, prior to placing the defense element in the predetermined defense location of the play area:

debiting a fourth monetary amount from a second credit account in response to the player indicating the predetermined defense location via the input device.

15. The method of claim 14, further comprising, in response to receiving an instruction to upgrade the defense element from the player via the input device:
debiting a fifth monetary amount to the second credit account; and
increasing one of the defense attack range, the defense attack rate, and the defense attack damage value of the defense element.

16. The method of claim 14, wherein crediting the second monetary amount to the first credit account comprises determining the second monetary amount based on a current monetary amount in the second credit account.

17. The method of claim 12, wherein the first credit account is a real currency credit account, and
wherein debiting the third monetary account comprises debiting the third monetary amount from a tsecond credit account comprising a virtual currency credit account.

18. An electronic gaming system comprising:
a processor circuit; and
a memory coupled to the processor circuit, the memory comprising machine-readable instructions that, when executed by the processor circuit:
cause the processor circuit to credit a first real currency monetary amount to a first credit account
cause the processor circuit to wager a first real currency wager amount for a wagering game, in response to a player placing a wager via an input device of the EGM;
cause a display device of the EGM to display a plurality of game elements as part of the wagering game, the plurality of game elements comprising:
a play area comprising an enemy entry location, an enemy goal location, and an enemy path between the enemy entry location and the enemy goal location;
an enemy element that travels along the enemy path from the enemy entry location toward the enemy goal location, the enemy element comprising an enemy health value, and an enemy speed value; and
a defense element that attacks the enemy element when the enemy element is within a defense attack range of the defense element, the defense element comprising a defense attack rate and a defense attack damage value, wherein the enemy health value of the enemy element is reduced based on the defense attack rate and the defense attack damage value when the enemy element is within the defense attack range of the defense element, and wherein reducing the enemy health value of the enemy element to zero destroys the enemy element;
in response to the enemy element being destroyed, cause the processor circuit to credit a second real currency monetary amount to a first credit account; and
in response to the enemy element reaching the enemy goal location, cause the processor circuit to debit a third monetary amount.

* * * * *